(12) United States Patent
Moradians

(10) Patent No.: US 6,773,213 B1
(45) Date of Patent: Aug. 10, 2004

(54) CARGO TIE DOWN IN A VEHICLE

(75) Inventor: Edward Moradians, Canoga Park, CA (US)

(73) Assignee: Ancra International, LLC., Hawthorne, CA (US)

( * ) Notice: Subject to any disclaimer, the term of this patent is extended or adjusted under 35 U.S.C. 154(b) by 0 days.

(21) Appl. No.: 10/420,653

(22) Filed: Apr. 23, 2003

Related U.S. Application Data
(60) Provisional application No. 60/391,159, filed on Jun. 26, 2002.

(51) Int. Cl.$^7$ .................................................. B60P 7/08
(52) U.S. Cl. ............................ 410/80; 410/77; 410/92; 410/105
(58) Field of Search .............................. 410/77, 80, 92, 410/105, 69, 79; 414/536; 244/118.1, 137.1; 248/500, 503

(56) References Cited

U.S. PATENT DOCUMENTS

| | | | | |
|---|---|---|---|---|
| 3,377,040 A | | 4/1968 | Hansen | |
| 3,652,050 A | | 3/1972 | Marrujo et al. | |
| 3,906,870 A | * | 9/1975 | Alberti ........................ | 410/79 |
| 4,026,218 A | | 5/1977 | Prete, Jr. et al. | |
| 4,109,891 A | | 8/1978 | Grendahl | |
| 4,457,649 A | * | 7/1984 | Vogg et al. .................... | 410/46 |
| 4,540,080 A | | 9/1985 | Nordstrom | |
| 4,557,648 A | * | 12/1985 | Koch et al. .................... | 410/78 |
| 5,234,297 A | * | 8/1993 | Wieck et al. .................. | 410/77 |
| 5,310,297 A | * | 5/1994 | Benjamin ..................... | 410/77 |
| 5,356,250 A | * | 10/1994 | Vogg et al. .................... | 410/86 |
| 5,486,077 A | * | 1/1996 | Nutting ........................ | 410/69 |
| 5,573,359 A | * | 11/1996 | Moradians .................... | 410/69 |
| 5,692,862 A | * | 12/1997 | Hilde ........................... | 410/69 |
| 5,957,640 A | * | 9/1999 | Schmieke et al. ............ | 410/80 |
| 6,318,938 B1 | * | 11/2001 | Araujo ......................... | 410/79 |
| 6,413,029 B1 | * | 7/2002 | Kernkamp .................... | 410/79 |
| 6,425,717 B1 | * | 7/2002 | Saggio et al. ................. | 410/79 |
| 6,450,744 B1 | * | 9/2002 | Gilhuys et al. ............... | 410/69 |

* cited by examiner

Primary Examiner—Stephen Gordon
(74) Attorney, Agent, or Firm—Edward A. Sokolski

(57) ABSTRACT

A plurality of rail assemblies are used for supporting cargo on the floor of a vehicle. Each rail assembly has two main parts, a cross track and a compression bar which are connected together. One free end of the compression bar has shear lugs which are fitted into a track having cutout portions separated from each other by lip portions which is attached to the vehicle floor. The other end of the cross track is attached to one end of the compression bar. The other end of the compression bar abuts against a tube member attached to the vehicle floor. Each rail assembly is attached at points between is ends to a pair of cross rails. Rollers along which the pallet on which the cargo is loaded and can be moved are attached to the cross tracks. The pallet is retained in position on the rail assemblies by mean of manually operable latch devices installed one each of the cross tracks of the rail assemblies which have tongues which fit into cavities in the pallet in response to manual actuation.

12 Claims, 5 Drawing Sheets

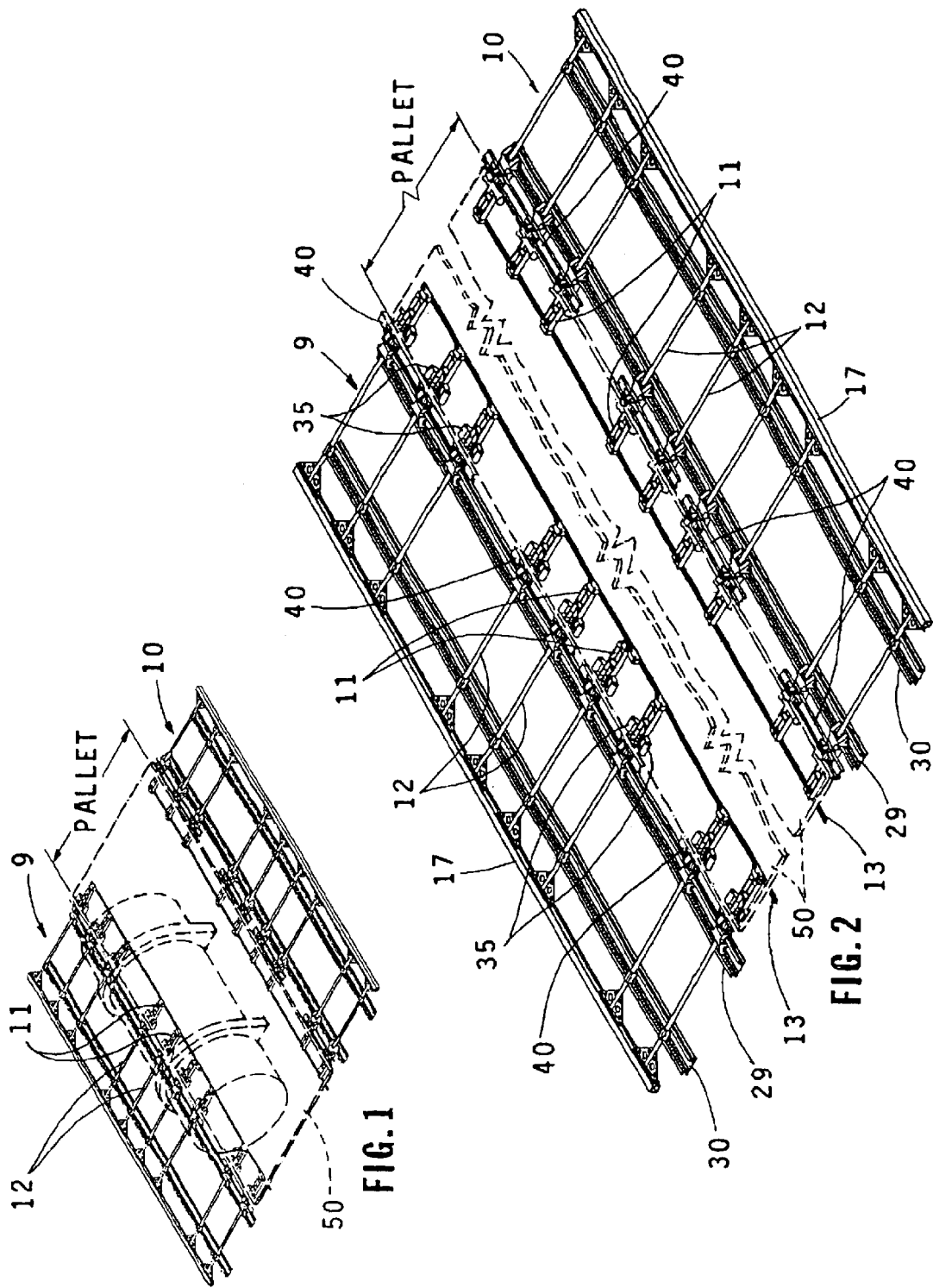

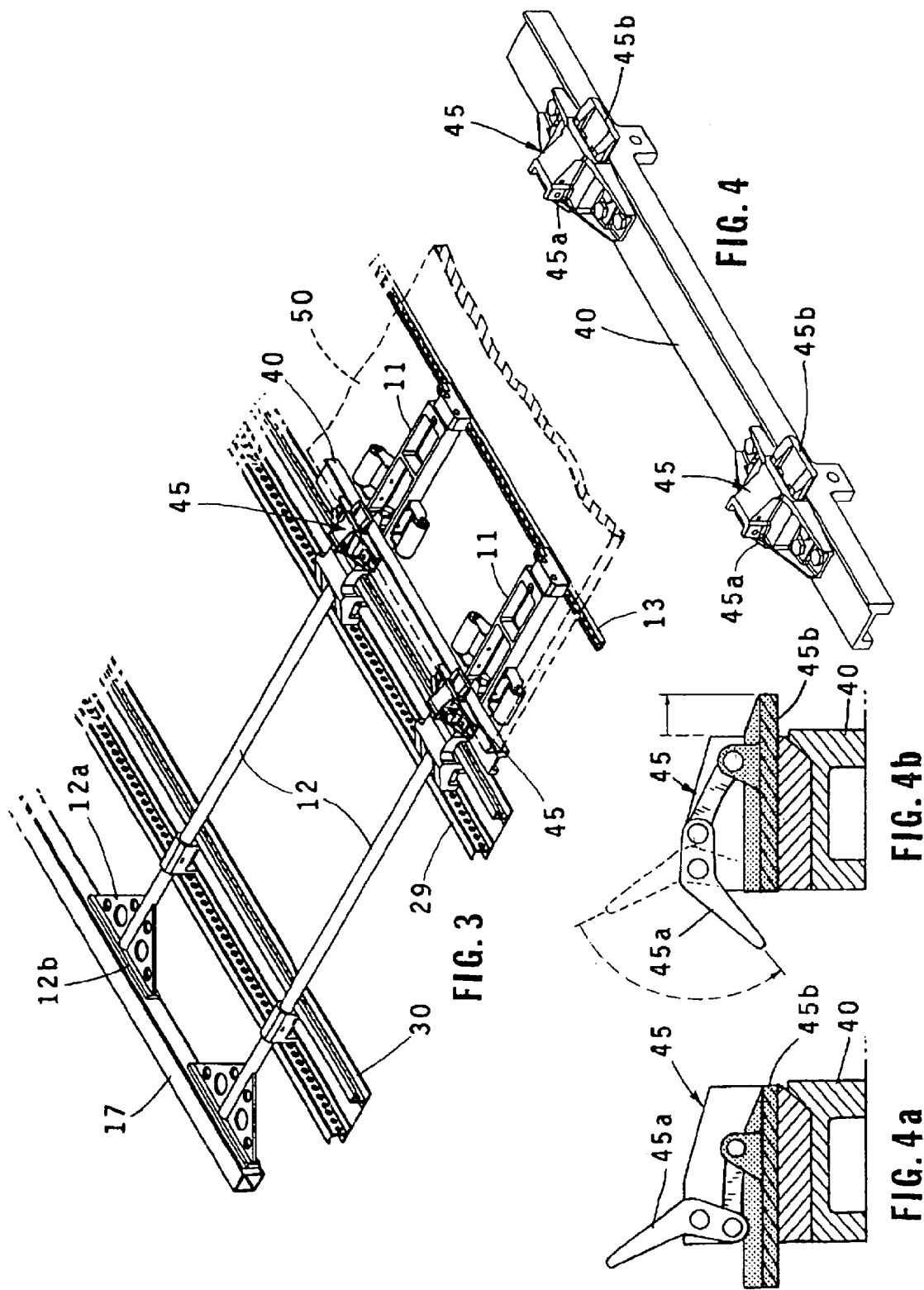

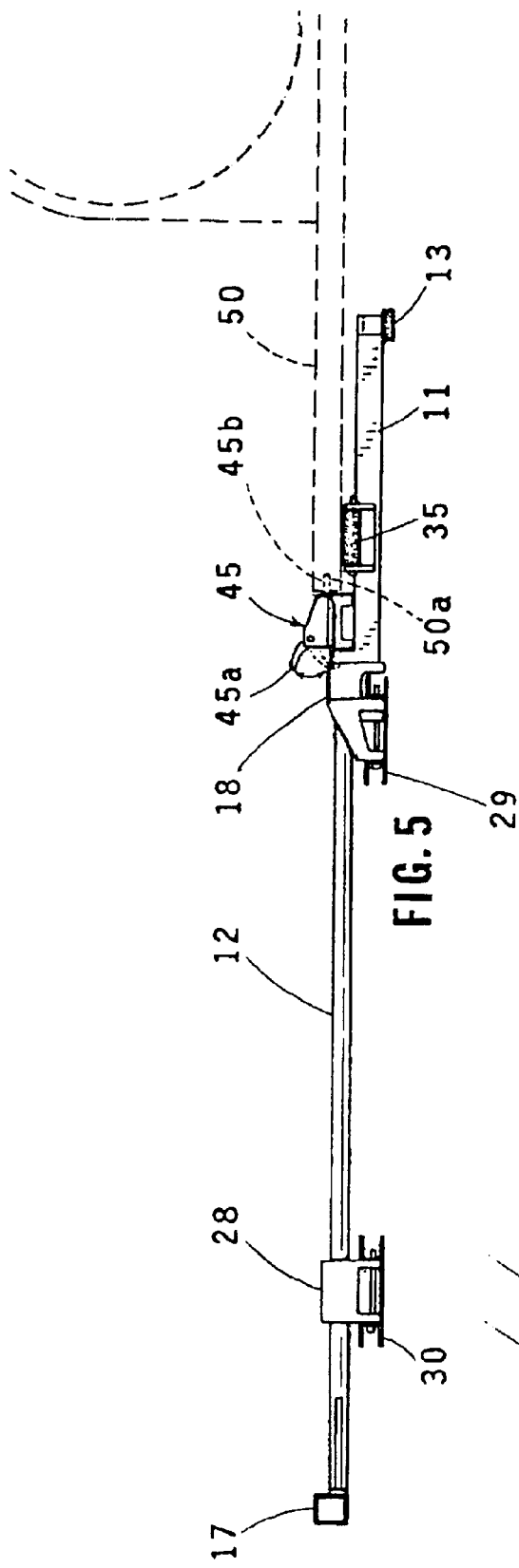
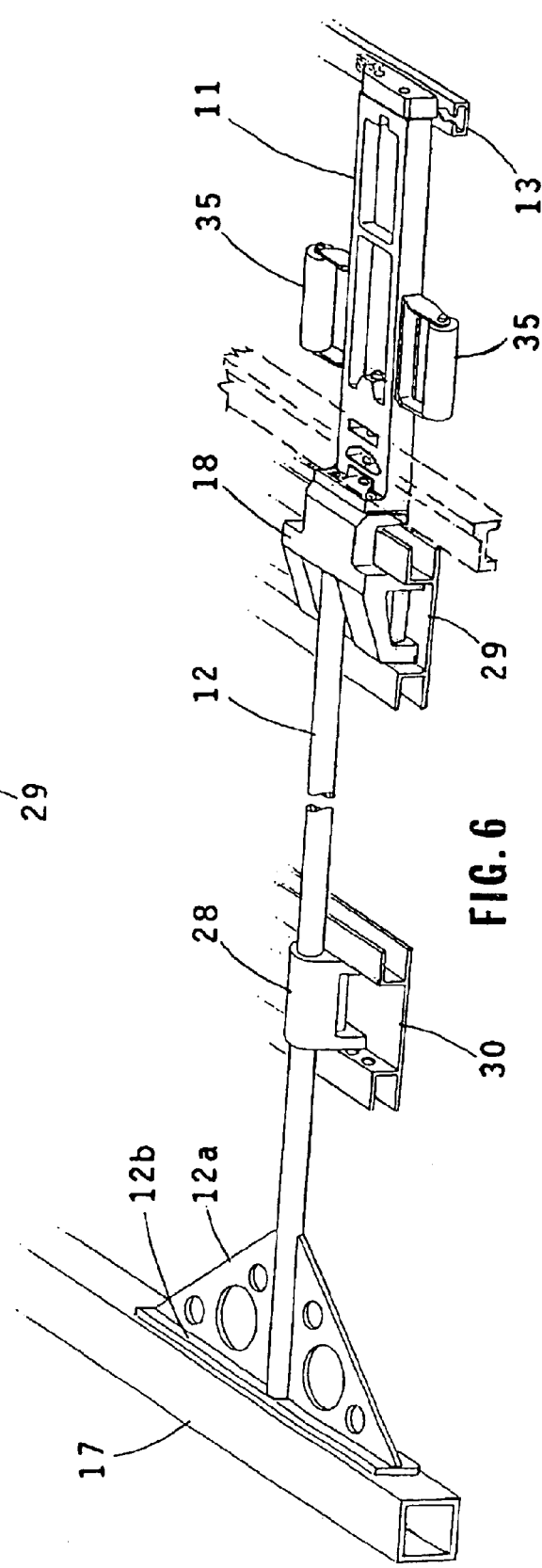

CARGO TIE DOWN IN A VEHICLE

This application is based on Provisional Application No. 60/391,159 filed Jun. 26, 2002.

BACKGROUND OF THE INVENTION

1. Field of the Invention

This invention relates to a device for tying down cargo loads on a vehicle such as an aircraft and more particularly to such a device which is capable of handling heavy loads supported on pallets.

2. Description of the Related Art

Prior art devices for tying down Cargo on a vehicle such as an aircraft are described in U.S. Pat. No. 4,540,080 issued to Nordstrom on Sep. 10, 1985 and U.S. Pat. No. 3,377,040 issued Apr. 9, 1968 to Hansen. These prior art devices are directed to restraining the movement of a cargo bearing pallet by means of a restraining arm which is positioned over the edge of a pallet to hold it in place. This device has the disadvantage of being inadequate for handling heavy loads which require greater restraint and support. Further, many of such devices are overly complicated in their construction and utilization and do not provide low friction support of the pallet which is necessary in positioning heavy loads in their final resting position.

SUMMARY OF THE INVENTION

The device of the invention overcomes the shortcomings of the prior art in providing adequate restraint for heavy cargo loads mounted on pallets in a vehicle such as an aircraft. The present invention enables rapid installation and removal of the restraints, permitting the pallets to be slid in on rollers to the restraint position where they are secured in place with latches. The device employs a plurality of rail assemblies which have two main portions which are connected together. These two portions comprise a cross track and a compression bar which provides a compression force on the cross tracks. One end of the cross tracks has shear lugs attached thereto which are fitted into a track having cutout portions separated from each other by lip portions. The track is mounted on the floor of the vehicle and provides support for the cross tracks on this end. Each cross track and compression bar are connected together and to a cross rail.

The end of each compression bar opposite to that attached to the associated cross bar abuts against a bar in a tensioned condition, this bar being attached to the vehicle floor. Each compression bar is attached to a second cross rail spaced from the rail to which it is attached, along with the cross track. Mounted on the inner end of each rail assembly is a latch device which has a tongue which fits into a cavity in the bottom of the pallet. These latch devices can be manually actuated to either latch the rail support assemblies to the pallet or release them therefrom to permit removal of the pallet. Rollers are installed on the rail support assemblies to facilitate loading and unloading of the pallet. The device of the invention thus provides a high strength pallet support which is capable of handling heavy loads and yet is of relatively simple and economical construction.

DESCRIPTION OF THE DRAWINGS

FIG. 1 is a top perspective view of a preferred embodiment of the invention showing a cargo being held in place;

FIG. 2 is a top perspective view of the preferred embodiment with the pallet supported thereon;

FIG. 3 is a top plan view of the embodiment of FIG. 1 illustrating the compression rod assemblies, cross track assemblies and the rails utilized in the device of the invention;

FIG. 4 is a top perspective view showing the latches of the preferred embodiment installed on a rail;

FIG. 4A is a cross sectional view of one of the latches of the preferred embodiment in its released position;

FIG. 4B is a cross sectional view of one of the latches in its latched position;

FIG. 5 is a side elevational view illustrating the compression bar and cross track;

FIG. 6 is a top perspective view of the compression bar and cross track;

DETAILED DESCRIPTION OF THE INVENTION

Figure 7:
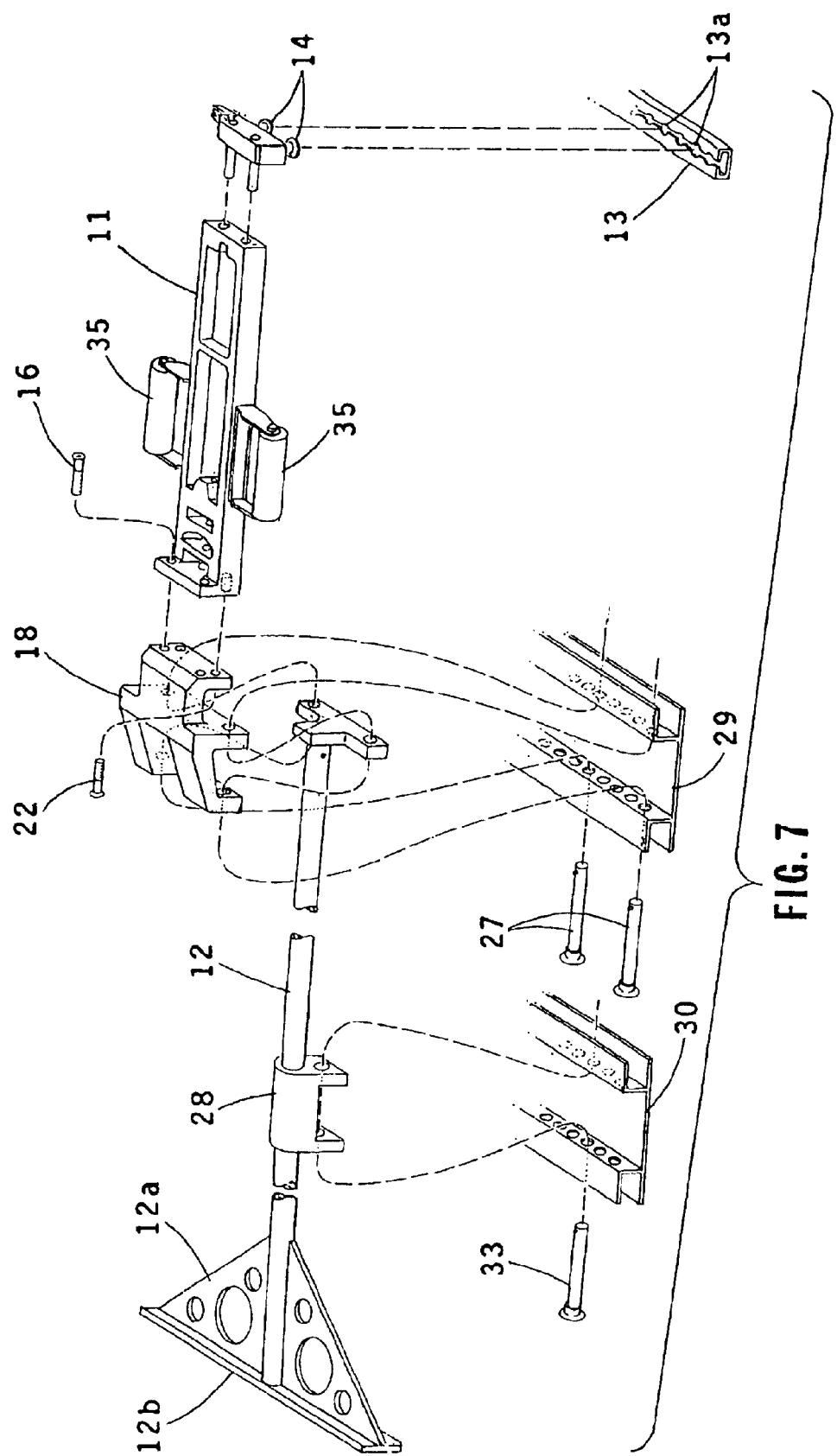
FIG. 7 is an exploded perspective view illustrating the assembly and installation of the cross track and compression bar.

Referring to FIGS. 1 and 2, the right and left hand rail assemblies of the invention 9 and 10 are illustrated. These two assemblies are the same. Each rail assembly, as shown in FIGS. 9 and 10 has two main components, a cross track 11 and a compression bar 12. As best shown in FIG. 7, the compression bar is attached at one of its ends to seat track 13, which is attached to the floor of the vehicle by means of shear lugs 14 which engage cut out portions 13a of the track and can be slid under adjacent lip portions of the track to retain the lugs to the track. This type of attachment is commonly used in mounting cargo in aircraft and is described in U.S. Pat. No. 4,540,080 issued Sep. 10, 1985 to Nordstrom. The opposite end of cross track 11 is connected to block mount 18 by means of pins 16. Rollers 15 are mounted on the cross track to facilitate movement of a pallet when it is being installed or removed from the vehicle.

Compression bar 12 has a triangular flat plate 12a on one end thereof. This plate Has a flat end piece 12b running normal thereto which, as be seen in FIG. 6 abuts against a square tube foreign a cross bar 17; this cross bar being attached to the floor of the vehicle. The other end of the compression bar, as can best be seen in FIG. 7 is attached to block mount 18 by means of pins 22. Block mount 18 is attached to cross rail 29 by means of pins 27.

The compression bar is additionally secured in position by means of block mount 28 which is secured to cross rail 30 by means of lock pin 33. Side loads are thus effectively restrained by the compression bar.

Figure 8:
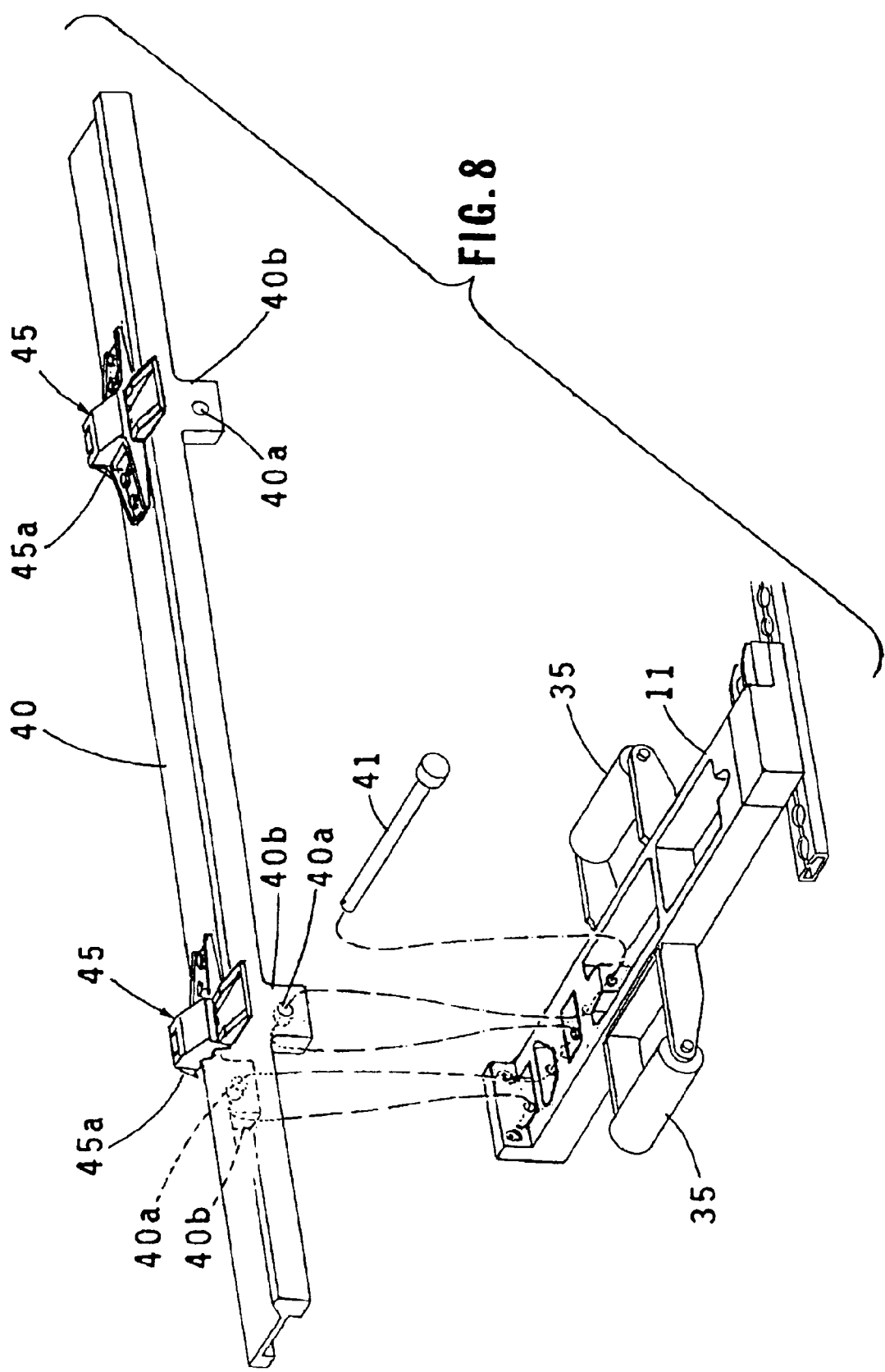
FIG. 8 is an exploded perspective view illustrating the cross track.

As shown in FIG. 8, cross rail 40 is supported between adjacent cross tracks by means of pins 41 which run through apertures 40a formed in posts 40b of the rail. As best can be seen in FIGS. 4, 4A and 4B, mounted on top of the rail assembly 40 is a latch device 45 to hold he pallet 50 in position. The latch device is shown in its unlatched position in FIG. 4A and in its latched position in FIG. 4B. The latch is operated by means of handle 45a and has a tongue 45b which fits into cavity 50a formed in the pallet so that with the handle 45a in the unlatched position, as shown in FIG. 4A the pallet can be unloaded and with the handle in the latched position, as shown in FIG. 4B, the pallet is retained in position.

Thus, the device of the invention can be used to rapidly and easily load and unload heavy cargos mounted on pallets and when loaded, such cargoes are held firmly in position.

While the invention has been described and illustrated in detail, this is by way of illustration and example only and is not to be taken by way of limitation, the spirit and scope of the invention being limited only by the following claims.

I claim:

1. A device for supporting a pallet having cargo loaded thereon on the floor of a vehicle comprising:
   a plurality of rail assemblies having first and second ends,
   means for connecting said first end of each of said rail assemblies to said vehicle floor,
   a cross bar attached to said vehicle floor,
   said second end of each of said rail assemblies abutting against said cross bar in a tensioned condition but not attached thereto, and
   a manually actuated latch mounted on each of said rail assemblies, said latches in a latched position engaging said pallets to retain said pallets in place.

2. The device of claim 1 wherein said rail assemblies each comprises a cross track and a compression bar interconnected on one of the ends thereof.

3. The device of claim 1 wherein said means for connecting said first end of said rail assemblies to the vehicle floor comprises a seat track having cutout portions separated from each other by lip portions, said first end of said rail assembly having shear lugs which fit into said track cutout portions.

4. The device of claim 1 wherein each second end of said rail assemblies includes a triangular flat plate and a flat end piece normal to said flat plate end piece abutting against said cross bar.

5. The device of claim 1 and further including a cross rail and a block mount connecting each of said rail assemblies to said cross rail.

6. The device of claim 5 and further including a second cross rail and a second block mount connecting each of said rail assemblies to said second cross rail.

7. The device of claim 1 wherein said latches have tongues and said pallet has cavities formed therein, said tongues each fitting into a respective one of said cavities when said latches are in their latched position.

8. A device for supporting a pallet having cargo thereon on the floor of a vehicle comprising:
   a plurality of rail assemblies, each including a cross track having first and second ends and a compression bar having first and second ends, said first ends of said compression bar being connected to said first ends of said cross tracks,
   said pallet being supported on said rail assemblies,
   means for attaching said second ends of said cross tracks to the floor of said vehicle,
   rollers mounted on each of said rail assemblies
   a cross bar attached to the vehicle floor,
   said second ends of said compression bars abutting against said cross bar, but not attached thereto,
   a cross rail,
   means for attaching each of said cross tracks and each of said compression bars to said cross rail,
   a second cross rail attached to said cross tracks, and
   manually actuated latches mounted on said second cross rail, said latches in latched positions engaging said pallet to retain said pallet in place.

9. The device of claim 8 wherein said rail assemblies are separated from each other in substantially parallel relationship.

10. The device of claim 8 wherein each of said latches has a tongue and said pallet has a cavity formed therein opposite each of said tongues, said tongues fitting into the pallet cavities when the associated latch is in its latched position.

11. The decive of claim 8 wherein the means for attaching the other of the ends of said cross tracks to the vehicle floor comprises a seat track having cutout portions separated from each other by lip portions, the other of the ends of said cross tracks having shear lugs which fit into cutout portions and can be moved from said cutout portions to said lip portions.

12. The device of claim 8 wherein said means for attaching said cross tracks and said compression bars to said cross rail comprises a block mount.

* * * * *